(12) United States Patent
Maruyama et al.

(10) Patent No.: US 7,681,001 B2
(45) Date of Patent: Mar. 16, 2010

(54) STORAGE SYSTEM

(75) Inventors: Naoko Maruyama, Kawasaki (JP);
Yuichi Taguchi, Sagamihara (JP);
Yasunori Kaneda, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 232 days.

(21) Appl. No.: 11/407,970

(22) Filed: Apr. 21, 2006

(65) Prior Publication Data
US 2007/0214334 A1 Sep. 13, 2007

(30) Foreign Application Priority Data
Mar. 7, 2006 (JP) ............................. 2006-060433

(51) Int. Cl.
*G06F 13/00* (2006.01)
*G06F 13/28* (2006.01)
(52) U.S. Cl. ...................................... 711/165; 711/162
(58) Field of Classification Search .................. 711/165, 711/162
See application file for complete search history.

(56) References Cited

U.S. PATENT DOCUMENTS

| 7,111,136 B2 * | 9/2006 | Yamagami | 711/162 |
| 7,197,520 B1 * | 3/2007 | Matthews et al. | 707/204 |
| 7,392,356 B1 * | 6/2008 | Hardman | 711/162 |
| 7,398,422 B2 * | 7/2008 | Amano et al. | 714/19 |
| 7,409,414 B2 * | 8/2008 | Okada et al. | 707/204 |
| 7,613,747 B1 * | 11/2009 | Thakur et al. | 707/204 |
| 2005/0015416 A1 * | 1/2005 | Yamagami | 707/204 |

* cited by examiner

*Primary Examiner*—Matt Kim
*Assistant Examiner*—Edward J Dudek
(74) *Attorney, Agent, or Firm*—Brundidge & Stanger, P.C.

(57) ABSTRACT

In a storage system having a function of acquiring update history information in correspondence with a write operation from a host, update data according to the amount of data written will become enormous. Thus, there is a problem in that long-term backup and data management using update history information is not possible. A management computer defines a service level according to time progress of data, and stores and manages update history information according to the service level in the respective stages. The management computer manages the update history information, and partially migrates update data from a certain storage system to another storage system according to the service level required in the data. The management computer also restores data in the storage system to which the update data was migrated.

9 Claims, 16 Drawing Sheets

FIG.6

| 601 WRITE TIME | 602 WRITE SEQUENCE NUMBER | 603 DATA STORAGE EXTENT IDENTIFIER | 604 DATA POSITION | 605 JOURNAL DATA STORAGE EXTENT IDENTIFIER | 606 JOURNAL DATA POSITION | 607 JOURNAL DATA SIZE (MB) |
|---|---|---|---|---|---|---|
| 08:10 | 1 | 00:00 | 0x01 | 01:0A | 0x01 | 100 |
| 11:30 | 2 | 00:00 | 0x0B | 01:0A | 0x09 | 100 |
| 14:45 | 3 | 00:00 | 0x10 | 01:0A | 0x0C | 100 |
| 18:20 | 4 | 00:00 | 0x1A | 01:0A | 0x1B | 100 |
| 23:15 | 5 | 00:00 | 0x1B | 01:0A | 0x9A | 100 |

| DATA STORAGE EXTENT IDENTIFIER (701) | JOURNAL DATA STORAGE EXTENT IDENTIFIER (702) | JOURNAL METADATA STORAGE EXTENT IDENTIFIER (703) |
|---|---|---|
| 00:00 | 01:05 | 00:05 |
| 00:01 | 01:06 | 00:06 |

| SNAPSHOT TIME INFORMATION (801) | SNAPSHOT DATA STORAGE EXTENT IDENTIFIER (802) | DATA STORAGE EXTENT IDENTIFIER (803) | JOURNAL DATA STORAGE EXTENT IDENTIFIER (804) | JOURNAL SIZE (MB) (805) |
|---|---|---|---|---|
| 2005 11 14 10:00 | 00:00 | 01:00 | 02:00 | 400 |
| 2005 11 14 12:00 | 00:01 | 01:00 | 02:01 | 200 |

| STORAGE APPARATUS IDENTIFIER | JOURNAL READ PERFORMANCE (MB/sec) |
|---|---|
| 100 | 100 |
| 120 | 50 |

FIG.11

| ELAPSED TIME (h) AFTER ACQUISITION OF JOURNAL | REQUIRED RECOVERY TIME (h) | STORAGE APPARATUS IDENTIFIER |
|---|---|---|
| 24 | 1 | 100 |
| 168 | 12 | 120 |
| 168 HOURS OR LONGER | 24 | 160 |

FIG.18

| STORAGE APPARATUS IDENTIFIER (1001) | JOURNAL READ PERFORMANCE (MB/sec) (1002) | RECOVERY TIME (h) (1801) |
|---|---|---|
| 100 | 100 | 0.83 |
| 120 | 50 | 1.67 |
| 160 | 50 | 1.67 |

| ELAPSED TIME (h) AFTER ACQUISITION OF JOURNAL (1101) | REQUIRED RECOVERY TIME (h) (1102) | STORAGE APPARATUS IDENTIFIER (1901) |
|---|---|---|
| 24 | 1 | 100 |
| 168 | 12 | |
| 168 HOURS OR LONGER | 24 | |

1900

STORAGE SYSTEM

CROSS-REFERENCES TO RELATED APPLICATIONS

This application relates to and claims priority from Japanese Patent Application No. 2006-060433, filed on Mar. 7, 2006, the entire disclosure of which is incorporated herein by reference.

BACKGROUND

The present invention generally relates to a computer system configured from a computer and a storage system, and in particular relates to a method of migrating data and history information to be updated by the computer between storage systems.

There is technology for storing update history of data and restoring data of an arbitrary time in data update (write) units. Japanese Patent Laid-Open Publication No. 2005-18738 (Patent Document 1) discloses technology of managing update history information (journal) of data in the same cabinet enclosure, and restoring data at an arbitrary point in time within a recoverable range. With the technology disclosed in Patent Document 1, if the storage extent for storing the update history information of data runs short, the storage extent is secured by deleting the update data at a point in time in order from the oldest update history or reflecting the update data to the data at such point in time so as to store the newly updated data of the update history information.

Further, US20050028022A1 (Patent Document 2) discloses technology of increasing free space by compressing and reducing the size of the update data in the event that the storage extent for storing the update history information of data runs short. Nevertheless, even with the technology disclosed in Patent Document 2, if the storage extent still runs short after the compression, it is necessary to delete the update data at a point in time in order from the oldest update history or reflect the update data to the data at such point in time.

SUMMARY

In recent years, companies are required, under regulatory compliance, to store corporate data including accounting data for several years without falsifying such data. In order to strictly record the writing of daily updated data, large amounts of update data and update history information thereof must be stored. Nevertheless, with the technology disclosed in Patent Document 1 and Patent Document 2, it is not possible to store and manage update history information for a long period of time since update data exceeding a fixed period of time is deleted in order from the oldest update history or reflected to the data at such point in time.

Meanwhile, when increasing the capacity of the storage extent in order to add the storage extent to be used in the storage and management of update history information, the performance of processing for extracting the corresponding update data from the vast storage extent and reflecting it to the data at such point in time (hereinafter referred to as "data restoration processing") will deteriorate. Thus, it would be difficult to perform data restoration processing within the time requested by the user.

Further, when migrating and storing update history information of data to and in a storage apparatus separate from the storage apparatus storing the data, the i performance of data restoration processing would depend on the performance of the apparatus at the migration destination and may deteriorate. Thus, it is not possible to guarantee the performance of data restoration processing within the time requested by the user.

In order to overcome the foregoing problems, a computer defines restoration request information in multiple stages regarding the update data of a storage system according to time progress information from the point in time such update data was updated, and time information in which a user requests the restoration processing of such update data based on time progress information. The computer monitors the update history information of data, specifies another storage system according to the restoration request information given to the data, and migrates the update data. The other storage system restores data using the migrated update data in the arbitrary point in time requested from the computer based on restoration request information.

According to the present invention, burden in the update processing of the storage system can be alleviated regarding the data in the storage system, and the update data can be stored and managed for a long period of time.

DESCRIPTION OF DRAWINGS

FIG. 6 is an example of journal metadata to be stored in the storage apparatus;

FIG. 7 is an example of a journal information management table to be stored in the storage apparatus;

FIG. 8 is an example of a snapshot management table to be stored in the storage apparatus;

FIG. 10 is an example of an apparatus-by-apparatus performance management table to be stored in the management computer;

FIG. 11 is an example of a service level definition information table to be stored in the management computer;

FIG. 18 is a diagram showing a modified example of the apparatus-by-apparatus performance management table in the first embodiment;

FIG. 19 is a diagram showing a modified example of the service level definition information table in the first embodiment.

DETAILED DESCRIPTION

Embodiments of the present invention are now explained with reference to the drawings. Incidentally, the following embodiments are merely examples, and the present invention shall not be in any way limited thereby.

First Embodiment

The first embodiment of the present invention is now explained with reference to FIG. 1 to FIG. 20.

Figure 1:
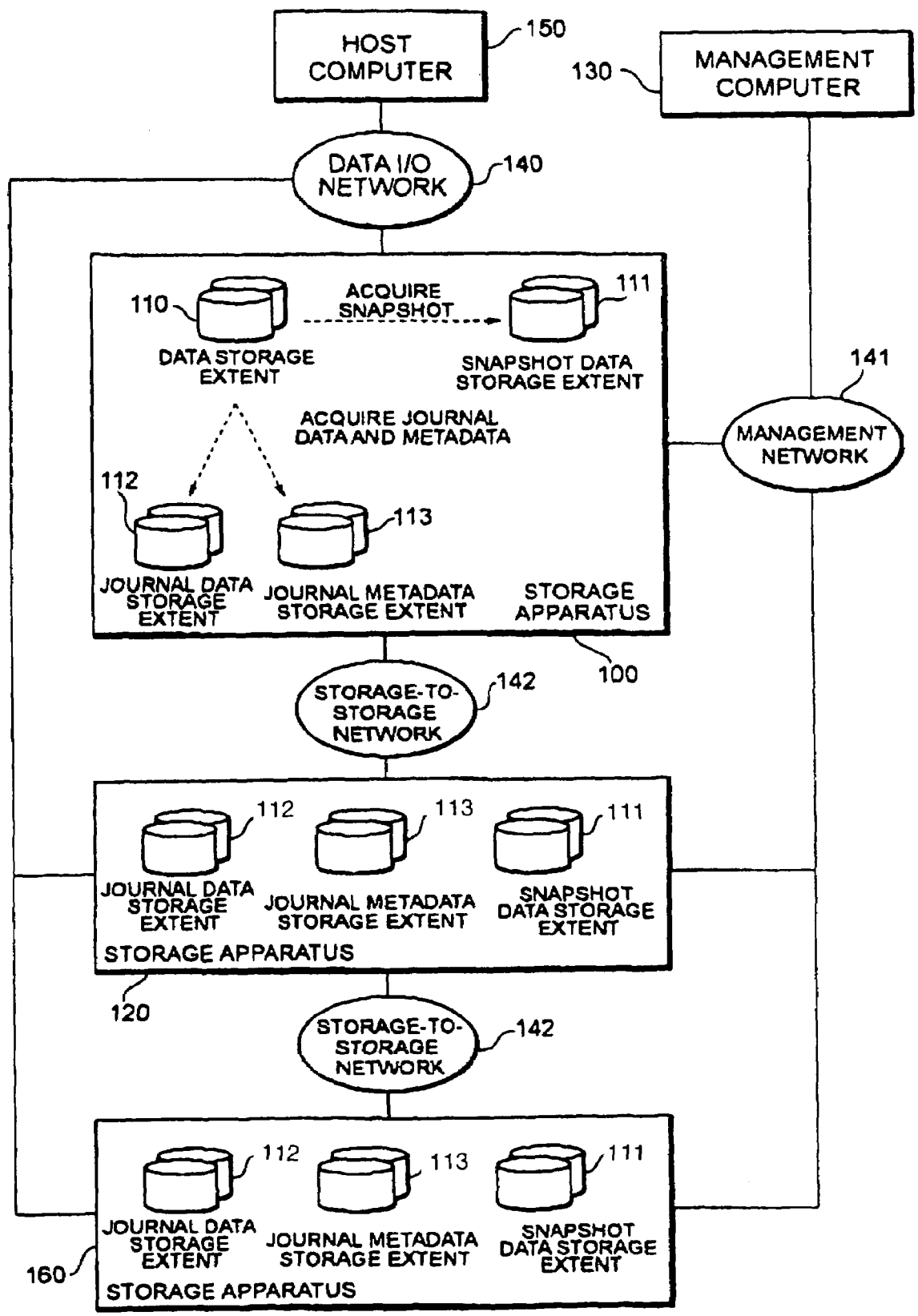
FIG. 1 is a view showing a frame format of the connection mode of the storage apparatus, host computer and management computer in the first embodiment of the present invention.

FIG. 1 is a view showing a frame format of the configuration of an embodiment of the present invention.

In FIG. 1, a host computer 150, and storage apparatuses 100, 120 and 160 are connected via a data I/O network 140. Further, the storage apparatuses 100, 120 and 160 communicate with each other via a storage-to-storage network 142. The data I/O network 140 and storage-to-storage network 142 are configured from a standard network connection mode such as a fibre channel or IP network.

Further, the present embodiment has a management computer 130 for managing the data communication of the storage apparatuses 100, 120 and 160, and the management computer 130 is connected to the storage apparatuses 100, 120 and 160 via a management network 141. The management network 141 is configured from a standard network connection mode such as a fibre channel or IP network. Further, the management network 141 may be shared by using the same network as the foregoing data I/O network 140. The management computer 130 and storage apparatuses 100, 120 and 160 mutually send and receive management information via this network.

The storage apparatus 100 has a data storage extent 110 for storing the received data upon receiving a write processing request from the host computer 150. Further, the storage apparatus 100 and storage apparatus 120 have a snapshot data storage extent 111 for storing replication data (hereinafter referred to as a "snapshot") of data in the data storage extent 110 at a certain point in time for backing up the data storage extent 110, and a journal data storage extent 112 and a journal metadata storage extent 113 for storing update data (hereinafter referred to as "journal data") of each write processing of the data storage extent 110 and update history information (hereinafter referred to as "journal metadata") of the update data. Incidentally, in this specification, journal data and journal metadata are collectively referred to as a journal.

Figure 2:
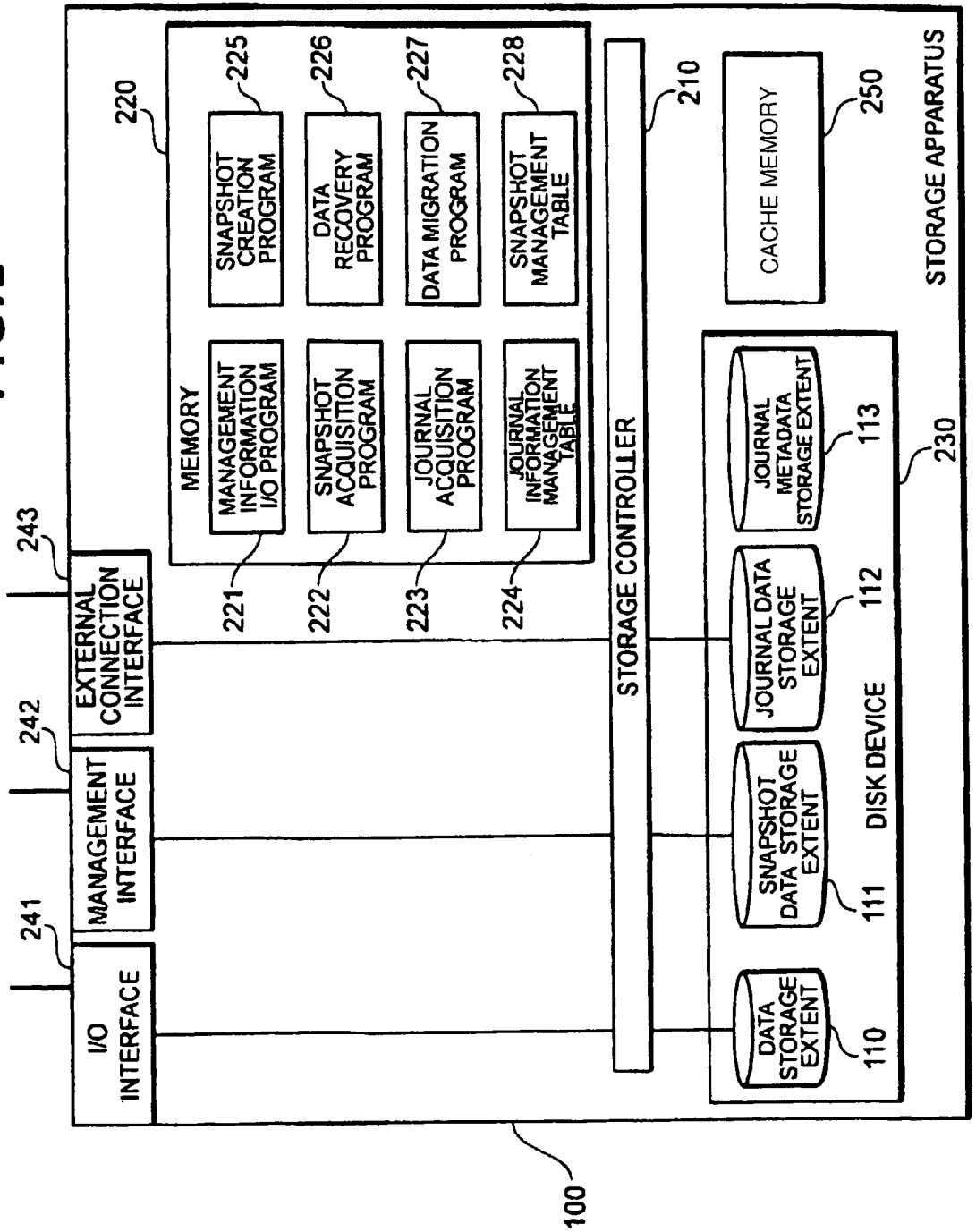
FIG. 2 is a view showing a frame format of the configuration in the storage apparatus in the first embodiment of the present invention.

Next, the configuration of the storage apparatus 100 is explained with reference to FIG. 2. FIG. 2 is a view showing a frame format of the internal configuration of the storage apparatus 100 which is the same as the storage apparatus 100 illustrated in FIG. 1.

The storage apparatus 100 internally has a storage controller 210, and a disk device 230, a cache memory 250 and a memory 220 are respectively connected to the storage controller 210. Further, external communication with the storage apparatus is conducted via an I/O interface 241, a management interface 242 and an external connection interface 243 connected to the storage controller 210 according to the application thereof.

The cache memory 250 will physically suffice so as long as it is a standard semiconductor storage apparatus, and is used as a temporary data storage extent as with a cache memory of a general-use computer. Incidentally, the cache memory 250 may be duplicated in order to avoid the loss of data when a failure occurs.

The disk device 230, for instance, is configured from one or more magnetic disk devices; that is, devices generally referred to as hard disks, and can be logically used by being divided into a plurality of data storage extents. The disk device 230 has a storage extent (data storage extent 110) for storing data to be read or written from the host computer 150. Further, the disk device 230 has a storage extent (snapshot storage extent 111) for storing a snapshot acquired with a snapshot acquisition program 222, a storage extent (journal data storage extent 112) for storing journal data acquired with a journal acquisition program 223, and a storage extent (journal metadata storage extent 113) for storing journal metadata acquired with a journal acquisition program 223. Incidentally, the size or quantity of the data storage extent 110, snapshot storage extent 111, journal data storage extent 112, and journal metadata storage extent 113 are not limited in this specification. Moreover, data to be stored in the respective storage extents described above may also be stored in the same storage extent.

The memory 220 is physically a storage extent configured from a magnetic disk device or a semiconductor storage apparatus, and accumulates various program groups and information which assumes the operation of the storage apparatus. A management information I/O program 221, a snapshot acquisition program 222, a journal acquisition program 223, a journal information management table 224, a snapshot creation program 225, a data recovery program 226, a data migration program 227, and a snapshot management table 228 are stored in the memory 220. The respective programs and tables are now explained. Incidentally, the storage controller 210 reads the programs and management information to be used by the programs stored in the memory from the memory 220, and processes such programs and management information.

The snapshot acquisition program 222 acquires a snapshot of the data storage extent 110 at a designated point in time. The acquired snapshot is stored in the snapshot storage extent 111. Further, the snapshot may also be acquired by forming a pair with the data storage extent 110 and snapshot data storage extent 111, and the snapshot acquisition program 222 replicating data in the data storage extent at a designated point in time.

The journal acquisition program 223 collects the journal data and journal metadata regarding all write operations issued from the host computer 150 to the data storage extent 110. The journal metadata includes at least the time in which the journal data was written, address of the write destination data storage extent, starting position of writing in the write destination data storage extent, and write sequence number. The journal acquisition program 223 stores the collected journal data in the journal data storage extent 112, and stores the collected journal metadata in the journal metadata storage extent 113, respectively. However, depending on the storage system, the journal data and journal metadata may also be stored in the same storage extent.

The journal information management table 224 is a table retained by the storage apparatus 100 for associating and managing the data storage extent 110, journal data storage extent 112, and journal metadata storage extent 113.

The snapshot creation program 225, by writing journal data (hereinafter referred to as "applying journal data") in a snapshot at a certain time acquired in the past based on information stored in the journal metadata, creates a snapshot at a time that is different from the snapshot before the application of the journal data. The snapshot creation program 225 updates the snapshot management table 228 each time a snapshot is created.

The data recovery program 226 restores data at the data restoration designated time received from the management computer 130. Details regarding the data restoration processing to be executed with the data recovery program 226 will be explained later with reference to FIG. 5.

The management information I/O program 221 sends and receives management information between the storage apparatus 100 and management computer 130. Further, the received management information is conveyed to a program or table in the memory 220. For example, when a data migration request is issued from the management computer 130, such information is received and conveyed to the data migration program 227.

The data migration program 227 migrates data between the storage apparatus 100 and storage apparatus 120 based on the data migration request received from the management computer 130 via the management information I/O program 221.

The internal configuration of the storage apparatuses 120, 160 may be the same as the storage apparatus 100. Further, the memory 220 in the storage apparatuses 120, 160 does not necessarily have to store the snapshot acquisition program 222, journal acquisition program 223 and data migration program 227. Nevertheless, the storage apparatus 120 may migrate the journal data to the storage apparatus 160 of a lower hierarchy prepared separately according to the same procedures as the storage apparatus 100, and, in such a case, it will suffice if the storage apparatus 120 has the foregoing programs.

Figure 3:
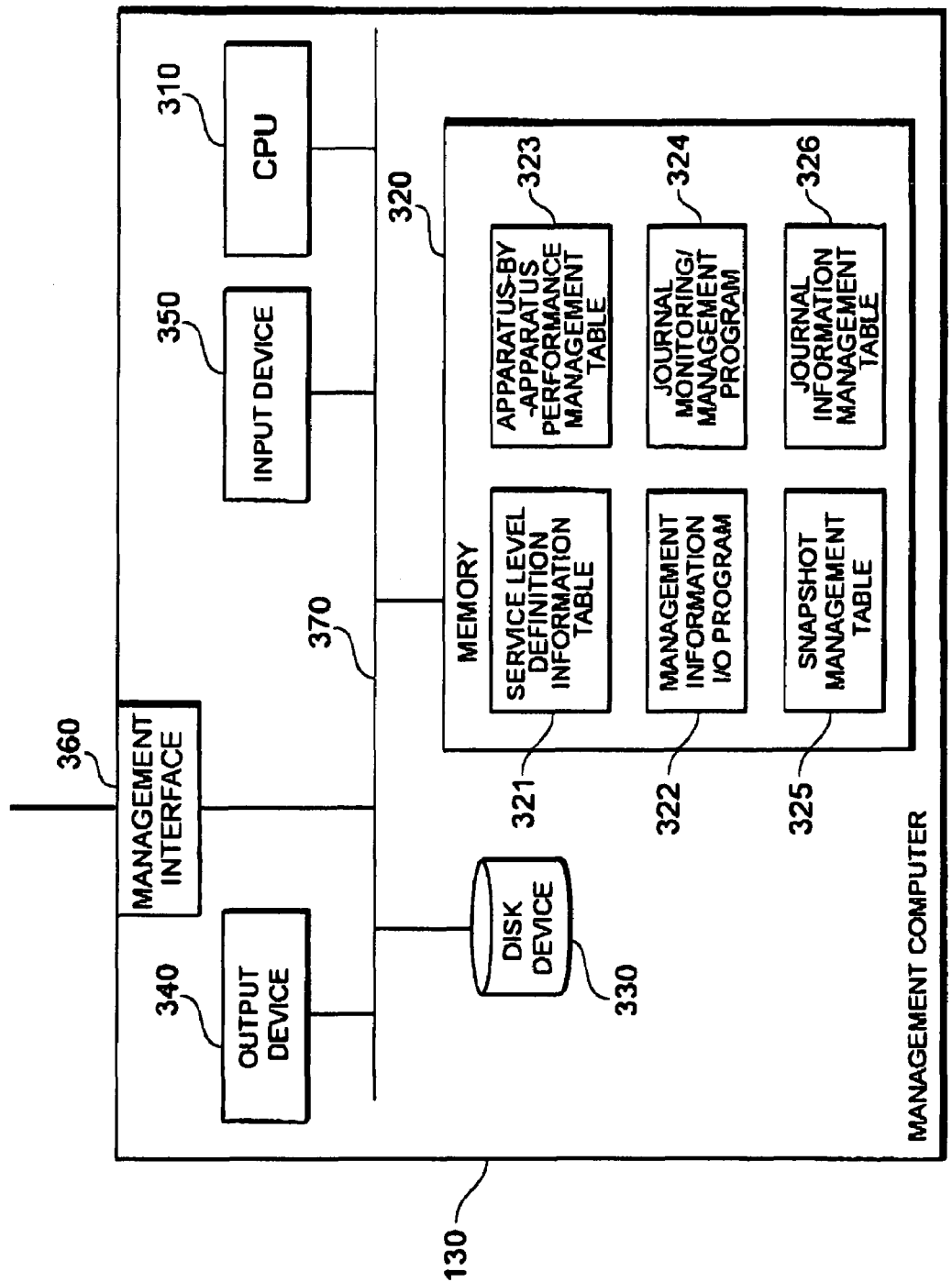
FIG. 3 is a view showing a frame format of the configuration in the management computer in the first embodiment of the present invention.

Next, the configuration of the management computer 130 is explained with reference to FIG. 3. The management computer 130 has a CPU 310, a memory 320, a disk device 330, an output device 340, an input device 350 and a management interface 360, and these components are respectively connected via a bus 370. The hardware configuration of the management computer 130, for instance, may be the same as the hardware configuration of a general-use computer (PC). For example, the input device 350 may be a device such as a keyboard or a mouse, and the output device 340 may be a display device such as a CRT or LCD or a video output device. Similarly, the management interface 360 may be a general-use communication device such as a LAN (Local Area Network). The memory 320 may be a data storage device configured from a magnetic storage apparatus or a semiconductor storage apparatus.

Programs and tables relating to the management of the storage apparatus 100 and storage apparatus 120 are stored in the memory 320. A service level definition information table 321, a management information I/O program 322, an apparatus-by-apparatus performance management table 323, a journal monitor/management program 324, a snapshot management table 325, and a journal information management table 326 are stored in the memory 320. Incidentally, the CPU 310 reads and processes the programs, and management information and tables to be used by the programs stored in the memory from the memory 320.

The programs and tables stored in the memory 320 are now explained.

The management information I/O program 322 sends and receives management information between the management computer 130 and storage apparatus 100 or storage apparatus 120. Further, the received management information is conveyed to a program or table in the memory 320.

The journal monitor/management program 324 monitors the elapsed time from the acquisition time of the journal data acquired based on the write operation to the data storage extent 110 in the storage apparatus 100. Further, the journal monitor/management program 324 refers to the service level definition information table 321 and, when the elapsed time from the acquisition of the journal data exceeds a time defined as an occasion of data migration, issues a journal migration request to the storage apparatus 100.

The snapshot management table 325 retains management information relating to the snapshots and journals retained by the respective storage apparatuses in the system. Incidentally, this table may be the same as the snapshot management table 228 to be stored in the memory 220 of the storage apparatus 100.

The service level definition information table 321 is a table for defining and storing a target value of the recovery time of data stored in a predetermined data storage extent in the system. The target value of the recovery time of data is determined based on various factors such as the purpose of use of data and system requirements, and is defined by the system administrator.

The apparatus-by-apparatus performance management table 323 is a table for managing performance information of each storage apparatus in the system.

The journal information management table 326 is a table retained by the management computer 130 for associating and managing the data storage extent 110, journal data storage extent 112, and journal metadata storage extent 113. Incidentally, this table may also be the same as the journal information management table 224 to be stored in the memory 220 of the storage apparatus 100.

Incidentally, a memory such as the memory 220 of the management computer 130 may be configured from a RAM (Random Access Memory) or the like.

Incidentally, the functional modules such as the foregoing journal monitor/management program 324 may be realized with software as described above, or may be realized as hardware with an arbitrary CPU or other LSI, or the combination thereof. Further, enablement of the foregoing configuration is the same in other functional modules such as the respective programs included in the storage apparatus 100.

Next, snapshot creation processing is explained with reference to FIG. 4.

Figure 4:
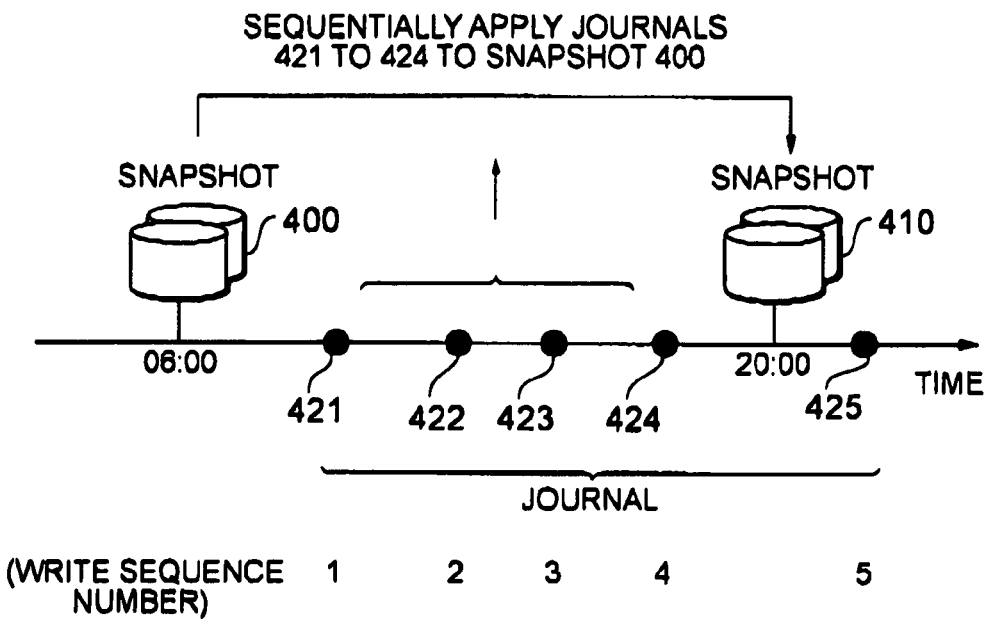
FIG. 4 is a diagram conceptually showing the operation of the snapshot creation program of the storage apparatus.

FIG. 4 is a view showing a frame format of the relationship of the old snapshot 400 and new snapshot 410 stored in the snapshot storage extent 111. The black dots disposed on the time axis signify that the journals 421 to 425 were respectively acquired at such points in time. The numerical values corresponding to the respective journals illustrated with the black dots coincide with the write sequence number given to the respective journal data and managed with the journal metadata. (Details regarding the write sequence number will be explained later with reference to FIG. 6.)

In FIG. 4, the snapshot 410 at time 20:00 is created by applying the journals 421, 422, 423 and 424 represented with write sequence numbers 1, 2, 3, 4 in order of the write sequence numbers shown with the journal metadata in relation to the snapshot 400 at time 06:00. Incidentally, upon creating a new snapshot 410, instead of applying journal data directly to the snapshot 400, a replication of the snapshot 400 may be created in the data storage extent 110 or snapshot data storage extent 111, and journal data may be applied to this replication.

Next, data restoration processing is explained with reference to FIG. 5.

Figure 5:
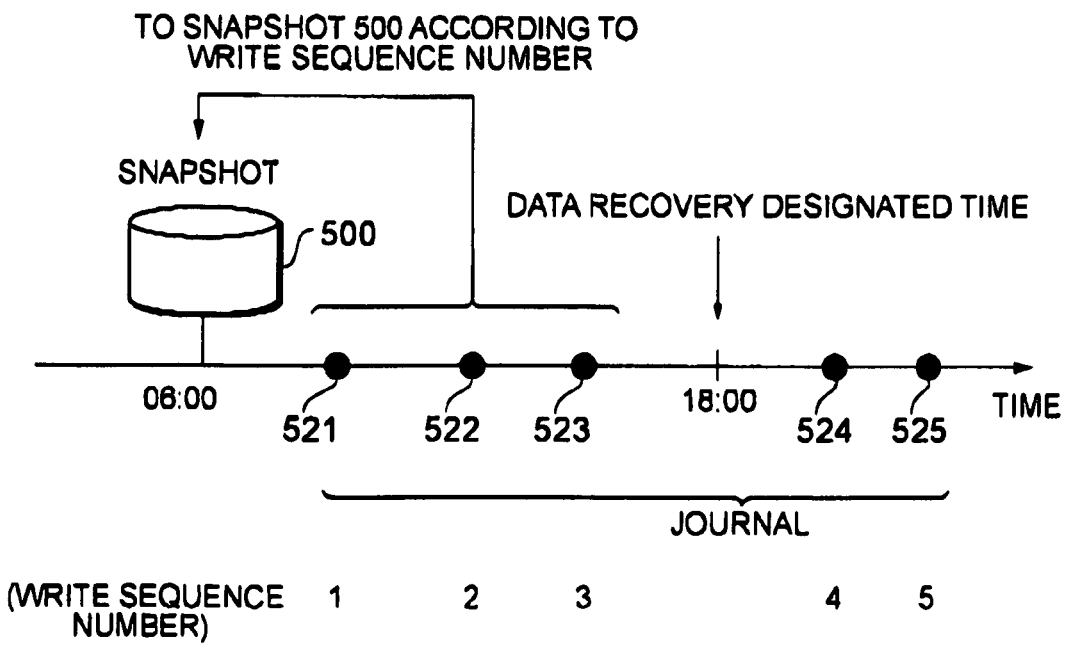
FIG. 5 is a diagram conceptually showing the operation of the data recovery program of the storage apparatus.

FIG. 5 is a view showing a frame format of the relationship of the snapshot 500 stored in the snapshot storage extent 111 and the journals acquired at the respective points in time on the time axis. As with FIG. 4, the black dots disposed on the time axis signify that the journals 521 to 525 were respectively acquired at such points in time. The numerical values corresponding to the respective journals illustrated with the black dots coincide with the write sequence number given to the respective journal data and managed with the journal metadata. (Details regarding the write sequence number will be explained later with reference to FIG. 6.)

The snapshot 500 is a snapshot at time 06:00 of the data storage extent 110 represented with the identifier 00:00 acquired with the snapshot acquisition program 222 or snapshot creation program 225.

When the data recovery program 226 receives a data recovery designated time (for instance, time 18:00) from the management computer 130, it applies the journal data acquired between the time 06:00 represented with the snapshot 500 and the data recovery designated time 18:00 to the snapshot data in the order of the write sequence numbers allocated to the journal metadata.

For example, in FIG. 5, the journal data acquired between time 06:00 and 20:00 are respectively journals 521, 522 and 523 given write sequence numbers 1, 2, 3, and the journals 524 and 525 given write sequence numbers 4, 5 are not included. Accordingly, it is possible to restore data at the data recovery designated time by using the data recovery program 226 and applying the journals 521, 522 and 523 in order to the snapshot 500.

Incidentally, it is evident that the data recovery program 226 may also create a replication of the snapshot 500 in the data storage extent 110 or snapshot data storage extent 111, apply journal data thereto, and restore data at the data recovery designated time.

FIG. 6 shows an example of journal metadata 600 to be stored in the journal metadata storage extent 113. Journal metadata is updated each time journal data is written. As shown in FIG. 6, a write time 601, a write sequence number 602, a data storage extent identifier 603, a data position 604, a journal data storage extent identifier 605, a journal data position 606, and a journal data size 607 are stored in the journal metadata 600.

Identifying information of the time when data was written in the data storage extent 110 is stored in the write time 601. For example, time information in which the storage apparatus 100 returned the write reply to the write request of data in the data storage extent from the host computer 150 is stored. Further, this may also be the time a write request was received from the host, the time data was written in the data storage extent 110, or the time journal data was stored in the journal data storage extent 112.

Identifying information for uniquely identifying journal data in the order of the write time 601 is stored in the write sequence number 602.

Identifying information for specifying the data storage extent 110 is stored in the data storage extent identifier 603.

Information showing the storage position of data in the data storage extent 110 is stored in the data position 604.

Information for identifying the journal data storage extent 112 from other storage extents is stored in the journal data storage extent identifier 605.

Information showing the storage position of journal data in the journal data storage extent 112 is stored in the journal data position 606.

Size of the corresponding journal data is stored in the journal data size 607.

For example, in FIG. 6, write sequence number 1 is given to data written in the storage position 0x01 in the data storage extent 110 represented with the identifier 00:00 at time 08:10, and shows that journal data is stored in the storage position 0x01 in the journal data storage extent 112 represented with the identifier 01:0A.

FIG. 7 is a diagram showing an example of the journal information management table 224. The journal information management table 224 is a table retained by the storage apparatus 100 for managing the group of data storage extent 110, journal data storage extent 112 and journal metadata storage extent 113. Incidentally, the journal information management table 326 of the management computer 130 is updated according to any change to the journal information management table 224 in the storage apparatus.

As shown in FIG. 7, a data storage extent identifier 701, a journal data storage extent identifier 702, and a journal metadata storage extent identifier 703 are stored in the journal information management table 224.

Identifying information for specifying the data storage extent 110 storing data corresponding to journal data is stored in the data storage extent identifier 701.

Identifying information for specifying the journal data storage extent 112 storing journal data is stored in the journal data storage extent identifier 702.

Identifying information for specifying the journal metadata storage extent 113 storing journal metadata corresponding to journal data is stored in the journal metadata storage extent identifier 703.

As described above, information similar to the journal information management table 224 is also synchronously stored in the journal information management table 326 in the management computer 130 at the time of update Incidentally, for example, when allocating a plurality of journal storage extents to a single data storage extent, the journal information management table 224 may also manage the time information in which the storage extent was allocated. Further, identifying information for specifying the storage apparatus may be further added to the journal information management table 326 of the management computer 130 so as to store information relating to journal management of each storage apparatus.

FIG. 8 shows an example of the snapshot management table 228.

The snapshot management table 228 is retained by the storage apparatus 100 for managing information relating to the snapshots of the data storage extent 110. Further, the snapshot management table 325 of the management computer 130 is updated according to any change to the snapshot management table 228.

Snapshot time information 801, a snapshot data storage extent identifier 802, a data storage extent identifier 803, a journal data storage extent identifier 804, and a journal size 805 are stored in the snapshot management table 228.

Time information in which the snapshot was acquired or created in the storage apparatus 100 is stored in the snapshot time information 801.

Identifying information for specifying the snapshot data storage extent 111 to become the storage location of the acquired or created snapshot is stored in the snapshot data storage extent identifier 802.

Identifying information of the data storage extent 110 to become the target upon acquiring or creating a snapshot is stored in the data storage extent identifier 803.

Identifying information of the journal data storage extent 112 storing journal data corresponding to the target data storage extent 110 for acquiring or creating a snapshot is stored in the journal data storage extent identifier 804.

Information showing the total size of the journal data acquired between the time each snapshot was acquired to the time until the subsequent snapshot is acquired regarding the respective snapshots is stored in the journal size 805. For example, with respect to the journal data written in the time between the snapshot acquisition time and the subsequent snapshot acquisition time, the journal size 805 is calculated as the sum of the respective journal data size 607 illustrated in FIG. 6. Incidentally, when there is no subsequent snapshot to be acquired, information showing the total size of the journal data acquired up to the write time of the latest journal data is stored in the journal size 805.

For example, in FIG. 8, the snapshot acquired at time information "2005 11 14 10:00" is stored in the snapshot data storage extent 111 represented with the identifier "00:00", and coincides with data of the data storage extent 110 represented with the identifier "01:00" at the same time. Further, journal data of the data storage extent 111 represented with the same identifier "01:00" is stored in the journal data storage extent 112 represented with the identifier "02:00". Moreover, the total size of the journal data acquired between the snapshot having time information of "2005 11 14 10:00" and the subsequently acquired or created snapshot (time information of "2005 11 14 12:00") is 400 (MB).

Incidentally, identifying information for specifying the storage apparatus may be further added to the snapshot management table 325 of the management computer 130 so as to store information relating to snapshots of each storage apparatus.

Figure 9:
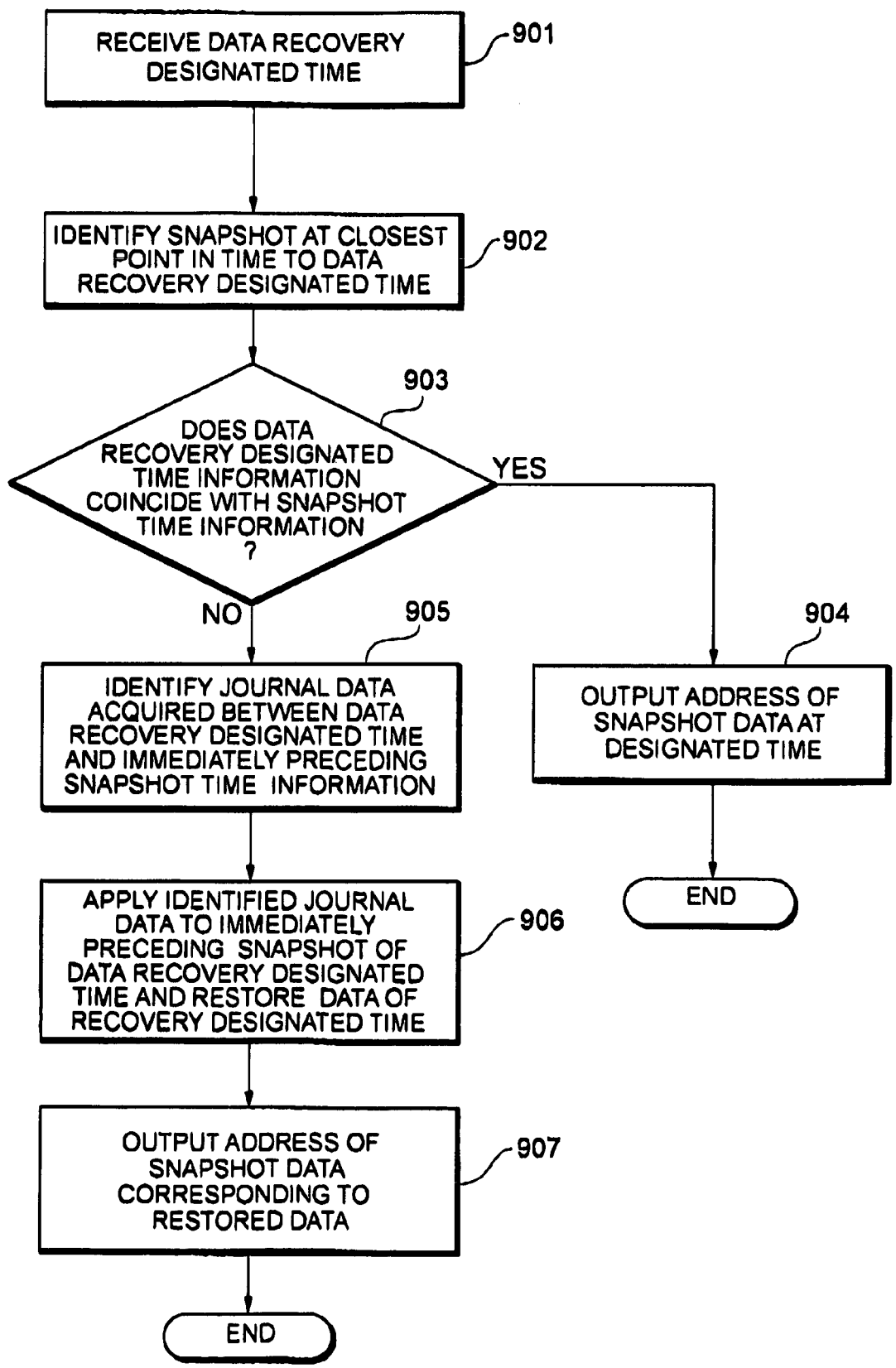
FIG. 9 is a diagram showing the processing flow of the data recovery system in the first embodiment.

Here, the operating flow of the data recovery program 226 is explained with reference to FIG. 9. This processing is executed by the storage controller 210 reading the data recovery program 226 from the memory when there is a recovery command from the management computer 130.

Foremost, the data recovery program 226 receives data recovery designated time from the management computer 130. The data recovery designated time received at step 901 is determined by the administrator and conveyed to the management computer 130 (step 901).

Next, the data recovery program 226 identifies a snapshot at a closest point in time that is before the designated time among the snapshots stored in the snapshot storage extent 111 (stop 902).

As a result of the identification, when the designated time and snapshot acquisition time coincide (step 903; Yes), the address information of such snapshot is conveyed to the management information I/O program 221 (step 904).

When the designated time and snapshot acquisition time do not coincide (step 903; No), the data recovery program 226 identifies the journal data acquired between the acquisition time of the snapshot identified at step 902 and the data recovery designated time (step 905).

The data recovery program 226 sequentially applies the journal data identified at step 906 to the snapshot identified at step 902, creates a snapshot at the data recovery designated time, and restores data (step 906).

The data recovery program 226 conveys to the management information I/O program 221 address information of the snapshot after it has been reflected in the journal data corresponding to the restored data, and then ends the processing (step 907).

Further, the data recovery program 226 may also create a replication of the snapshot acquired at a point in time closest to the data recovery designated time in the data storage extent 110 or another storage extent, and perform the series of data recovery operations to the replicated snapshot.

As described above, it is possible to restore data at an arbitrary data recovery designated time by using snapshots and journals.

In the present embodiment, a storage apparatus is specified according to the time information requested in the data restoration processing using journal data in correspondence with the elapsed time after the update of data to be stored in the storage apparatus 100, and processing for migrating such journal to the specified storage apparatus is performed. Tables and processing relating to this migration processing are now explained.

FIG. 10 shows an example of an apparatus-by-apparatus performance management table 323 of the management computer 130. The apparatus-by-apparatus performance management table 323 is a table for managing performance information of each storage apparatus in the system connected to the management computer 130 in the present embodiment. The apparatus-by-apparatus performance management table 323 illustrated in FIG. 10 manages the storage apparatus identifier 1001 storing identifying information of the storage apparatus of the system in the present embodiment, and the journal read performance information 1002 of the storage apparatus. The journal read performance 1002 is the size of the journal data which the storage can detect and read from the storage extent per unit time. Journal read performance is given in advance based on the measurement value or logical calculation formula as the performance of the storage apparatus.

FIG. 11 shows an example of the service level definition information table 321 retained by the management computer 130. The management computer 130 receives a value input by the administrator via the input device 350, sets a level of a different stage according to the data recovery request from the user as the service level, and registers this in the service level definition information table 321. The management computer 130 refers to the information registered in the service level definition information table 321, and migrates the journal to the corresponding storage apparatus.

In the present embodiment, a service level is defined based on the elapsed time from the time the journal data was acquired. An elapsed time after acquisition of journal 1101, required recovery time 1102, and a storage apparatus identifier 1103 are registered in the service level definition information table 321.

Information showing the elapsed time to become the occasion of data migration based on the elapsed time from the write time of journal data acquired for the respective data units in a certain data unit is registered in the elapsed time after acquisition of journal 1101.

As the data unit, for instance, a fixed journal data count may be decided based on the write sequence number 602 regarding one or more journal data acquired for a certain data storage extent 110 in the journal metadata illustrated in FIG. 6, and this journal data count may be used as the data unit. Further, the total size of fixed journal data may be decided based on the sum of the journal data size 607 illustrated in FIG. 6, and this total size of journal data may also be used as the data unit.

Further, as a specific calculation method of the elapsed time from the write time of journal data, there are the following methods. For example, in the data units described above, there is a method of calculating the elapsed time from the write time 601 of each journal data in FIG. 6 to the present time, and comparing the average value of the values calculated for each journal data and the value registered in the elapsed time after acquisition of journal 1101. Further, there is another method of comparing the elapsed time from the journal data written at the latest point in time in data units and the value registered in the elapsed time after acquisition of journal 1101. The former method is used in the present embodiment.

Information showing the recovery time of data requested by the user when recovering data contained in such data units corresponding to the respective stages of the elapsed time after acquisition of journal 1101 is registered in the required recovery time 1102.

Identifying information of the storage apparatus storing journal data of the data contained in such data units corresponding to the respective stages of the elapsed time after acquisition of journal 1101 is registered in the storage apparatus identifier 1103. For example, in the storage apparatus identifier 1103, it is possible to set in advance a time required for the storage apparatus to perform processing for restoring data using a value registered in the journal read performance 1002 shown in FIG. 10 and a value of a fixed amount of journal size, and select and register a storage apparatus in the system corresponding to the required recovery time 1102.

The service level defined in FIG. 11 is now explained with reference to specific examples.

If the elapsed time after acquiring the journal data regarding the data units in the data storage extent 110 is within 24 hours, the time requested by the user for recovering this data storage extent 110 will be 1 hour, and journal data is stored in the storage apparatus 100. Next, if the elapsed time after the acquisition of journal data exceeds 24 hours but is within 168 hours, the required recovery time is 12 hours, and journal data is stored in the storage apparatus 120. Further, when the elapsed time after the acquisition of journal data exceeds 168 hours, the required recovery time is 24 hours, and journal data is stored in the storage apparatus in which the storage apparatus identifier is represented with 160.

Incidentally, as shown in FIG. 11, in the present embodiment, although the service levels are provided in 3 stages based on the elapsed time after acquisition of journal 1101, the number of stages for defining the service level is not limited thereto. Further, when the elapsed time after acquisition of journal exceeds a fixed time at the lowest stage defined in the service level, data may be sequentially abandoned in order from the oldest data.

Incidentally, definition of the service level is not limited to the foregoing items, and may be arbitrary determined according to the administrator or management method, or based on the information requested by the user.

Journal migration processing in the present embodiment is now explained with reference to FIG. 12. Journal migration processing is realized by the CPU 310 of the management computer 130 reading and executing the journal monitor/management program 324 from the memory 320, and the storage controller 210 of the storage apparatus 100 reading and executing the data migration program 227 from the memory 220.

The journal monitor/management program 324 in the management computer 130 monitors the elapsed time of journals for each data unit in the storage apparatus 100. Specifically, a method of polling the storage apparatus 100, referring to the journal metadata, and receiving a value obtained by calculating the elapsed time for each data unit may be adopted (step 1201).

The journal monitor/management program 324 determines whether the calculated value of the elapsed time after the acquisition of journal exceeds the value of the elapsed time after acquisition of journal 1101 set as the occasion of journal migration by the service level definition information table 321 (step 1202).

At step 1202, if the foregoing calculated value is not exceeding the value of the elapsed time after acquisition of journal 1101, the journal monitor/management program 324 returns to step 1201 once again, and continues monitoring the storage apparatus 100.

At step 1202, if the foregoing calculated value is exceeding the value of the elapsed time after acquisition of journal 1101, the journal monitor/management program 324 sends a journal migration request to the storage apparatus 100 of the journal source via the management information I/O program 322 based on the definition information of the service level definition information table 321. The journal migration request includes at least a storage apparatus identifier of the destination, an identifier of the journal data storage extent to be migrated, and an identifier of the journal metadata storage extent to be migrated. Specifically, as shown in FIG. 7, values of the respective identifiers stored in the journal information management table 326 retained by the management computer 130 are included in the journal migration request (step 1203).

The management information I/O program 221 in the storage apparatus 100 receives a journal migration request from the management computer 130. The management information I/O program 221 conveys the received journal migration request to the data migration program 227 (step 1204).

The data migration program 227 executes the migration of journal data and journal metadata based on the journal migration request. Incidentally, the storage apparatuses of the migration source and migration destination respectively update the journal information management table 224 according to the attribute information included in the journal to be migrated.

Further, at this step, the data migration program 227 of the storage apparatus 100 may also migrate, together with the journal data and journal metadata, the snapshot data immediately before the journal to be migrated is acquired to the storage apparatus of the migration destination. For example, the management computer 130 specifies the immediately preceding snapshot based on the snapshot management table 325, and conveys the journal migration request containing identifying information of the specified snapshot to the data migration program 227. Incidentally, when the snapshot is to be migrated, the storage apparatuses of the migration source and migration destination update the snapshot management table 228 based on the attribute information of the snapshot to be migrated (step 1205).

When the journal migration is complete, the storage apparatus 100 sends a journal migration completion notice to the management computer 130 via the management information I/O program 221 (step 1206).

The management information I/O program 322 in the management computer 130 receives the journal migration completion notice. At this step, the journal monitor/management program 324 updates the journal information management table 326 (step 1207), and thereafter ends the journal migration processing.

Figure 15:
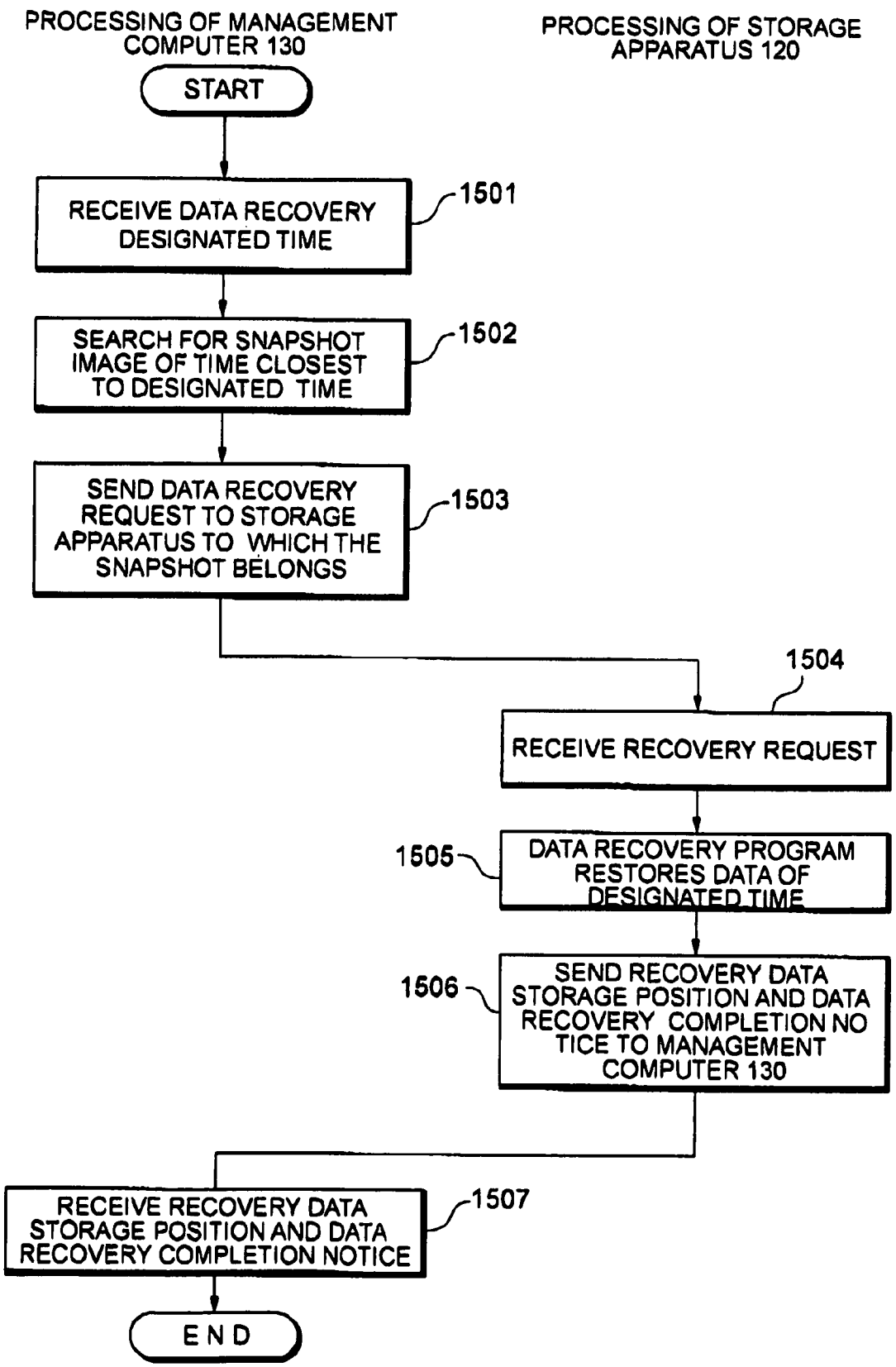
FIG. 15 is a diagram showing the data recovery processing flow in the first embodiment.

Next, recovery processing in the storage apparatus 120 of the migration destination upon migrating the journal data is explained with reference to FIG. 15. As explained previously with reference to FIG. 9, it is possible to restore data at an arbitrary point in time by the respective storage apparatuses storing and managing the snapshots and journals. Here, described is a method of detecting that the journal to be applied to the data of the time designated by the administrator is stored in the storage apparatus 100 or 120, and performing recovery processing in the detected storage apparatus. This recovery processing is realized by the CPU 310 of the management computer 130 reading and executing the journal monitor/management program 324 from the memory 32, and the storage controller 210 of the storage apparatus 100 or 120 reading and executing the data recovery program 226 from the memory 220.

In the management computer 130, the administrator designates the time to restore the data using the input device 350, and the management computer 130 receives the data recovery designated time designated by the administrator (step 1501). Next, the journal monitor/management program 324 in the management computer 130 refers to the snapshot management table 325 retained by the management computer 130 and searches for the snapshot data at the point in time closest to the time designated by the administrator (step 1502). A data recovery request is sent to the storage apparatus (storage apparatus 100 or storage apparatus 120) to which the snapshot data specified as a result of the search belongs. This data recovery request describes at least the data recovery designated time (step 1503).

The storage apparatus 100 or storage apparatus 120 receives the data recovery request (stop 1504), and restores data of the data recovery designated time with the data recovery program 226. Incidentally, the recovery method is the same as the processing described with reference to FIG. 9 (step 1505).

After data restoration is complete, the storage apparatus 100 or 120 sends the storage extent storing the data restored via the management information I/O program 322 and the storage position in the storage extent, together with the data recovery completion notice, to the management computer 130 (step 1506).

The management information I/O program 322 in the management computer 130 receives this (step 1507), and ends the data recovery processing.

Incidentally, in the present embodiment, the data recovery processing realizes the restoration of data in the storage apparatus via the communication between the management computer 130 and a single storage apparatus that received the data recovery request.

As described above, the management computer 130 defines the service level in the recovery processing of data, and it is thereby possible to realize the recovery of data satisfying this service level in all storage apparatuses.

According to the first embodiment, it is possible to migrate journals between storage apparatuses based on a service level according to the data. Further, when a journal is migrated, since data can be restored in the storage apparatus of the migration destination, it is possible to perform the data recovery operation without placing a burden on the processing of another apparatus in the system. The host computer is able to use the data restored by accessing the storage apparatus of the migration destination, or transfer and use the data restored in an arbitrary storage apparatus of the migration destination.

MODIFIED EXAMPLE 1

In the first embodiment described above, when journal data and journal metadata are migrated from the storage apparatus 100 to another storage apparatus 120, depending on the size of the journal to be migrated, the time required for the recovery of data destination (hereinafter referred to as "recovery time") in the storage apparatus will change. Thus, in order to guarantee the required recovery time 1102 from the user defined in the service level definition information table 321 also in the destination storage apparatus, a means for managing the required recovery time of data for each storage apparatus storing a journal is necessary. The management computer 130 creates a snapshot and operates the recovery time of the storage apparatus 120 when the storage apparatus 120 does not satisfy the required recovery time defined in the service level definition information table 321.

Processing of the management computer 130 operating the recovery-time of the storage apparatus 120 of the journal destination is explained below. This recovery time operational processing is realized by the CPU 310 of the management computer 130 reading and executing the journal monitor/management program 324 from the memory 320, and the storage controller 210 of the storage apparatus 120 reading and executing the snapshot program 225 from the memory 220 when data is migrated.

Recovery time operational processing is now explained with reference to FIG. 13.

Foremost, the journal monitor/management program 324 of the management computer 130 calculates the maximum recovery time in the storage apparatus 120 of the journal destination based on the snapshot management table 325. Maximum recovery time is the maximum value of time required from applying the first journal data to be applied to applying the last journal data to be applied upon applying journal data one-by-one to the base snapshot for restoring data. Here, the scope of applying journal data from a certain snapshot to the subsequent snapshot is referred to as a snapshot section.

For example, in the present embodiment, the maximum recovery time can be hypothesized to be the maximum value of the recovery time calculated with formula (1) below using the value of the journal size 805 in the respective snapshot sections in the snapshot management table 325 illustrated in FIG. 8, and the value of the journal read performance 1002 in the apparatus-by-apparatus performance management table 323 illustrated in FIG. 10.

(Recovery time)=(journal size of snapshot section)/(journal read performance of destination storage apparatus)    (1)

In other words, the journal monitor/management program 324 calculates the recovery time of the respective snapshot sections shows in formula (1) regarding each snapshot managed by the management computer 130, and compares these values in order to calculate the maximum recovery time (step 1301).

Next, the journal monitor/management program 324 compares the calculated maximum recovery time and the required recovery time 1102 registered in the service level definition information table 321, determines whether the service level of this data is satisfied, and, when the maximum recovery time satisfies the service level, ends the recovery time operational processing (step 1302).

At step 1302, when the maximum recovery time does not satisfy the service level (step 1302; No), the journal monitor/management program 324 creates a snapshot addition request. Details regarding the creation of a snapshot addition request will be described later with reference to FIG. 14 (step 1303).

The management computer 130 sends the created snapshot addition request to the storage apparatus 120 via the management information I/O program 322 (step 1304).

The management information I/O program 221 in the storage apparatus 120 receives a snapshot addition request from the management computer 130, and conveys this to the snapshot creation program 225 (step 1305).

The snapshot creation program 225 creates a snapshot based on the information described in the received snapshot addition request. Incidentally, the snapshot creation processing at this step is the same as the snapshot creation processing in the storage apparatus 100 described with reference to FIG. 4. Incidentally, the storage apparatus 120 receives data in the data storage extent 110 or the snapshot in the snapshot data storage extent 111 from the storage apparatus 100 at an arbitrary point in time before receiving the snapshot addition request, and creates a snapshot in the storage apparatus 120 based on the received data or snapshot. When the snapshot creation program 225 receives the snapshot addition request, it creates an additional snapshot based on the snapshot created immediately before the time information contained in the snapshot addition request. Further, the storage apparatus 120 may also receive the corresponding snapshot in the snapshot data storage extent 111 from the storage apparatus 100 upon receiving the snapshot addition request, and create the additional snapshot based on the received snapshot (step 1306).

After the snapshot creation processing is complete, the management information I/O program 221 in the storage apparatus 120 sends a snapshot addition completion notice to the management computer 130 (step 1307), and updates the snapshot management table 228 retained by the storage apparatus 120 (step 1308).

The management information I/O program 322 in the management computer 130 receives the snapshot addition completion notice from the storage apparatus 120 (step 1309). Next, the management information I/O program 322 updates the snapshot management table 325 (step 1310), and ends the recovery time operational processing.

Incidentally, the recovery time calculated at step 1301 may also be output to the output device 340 in the management computer 130 for notifying the administrator.

Further, in the recovery time operational processing described above, although a case of snapshot addition processing was explained where the maximum recovery time is greater than the required recovery time, if the maximum recovery time is excessively smaller than the required recovery time, it is also possible to delete the snapshots retained by the storage apparatus 120. Here, the storage apparatus 120 may perform processing to increase the maximum recovery time such as by increasing the interval of acquiring the snapshots, or appropriately deleting the snapshots stored in the storage apparatus 120 so as to increase the journal size between the snapshots.

Incidentally, recovery time operational processing may also be executed based on a command from the management computer 130 at an arbitrary occasion after the journal migration to the storage apparatus 120 of the migration destination and before receiving a recovery request from the management computer 130, or it may also be executed automatically.

Figure 13:
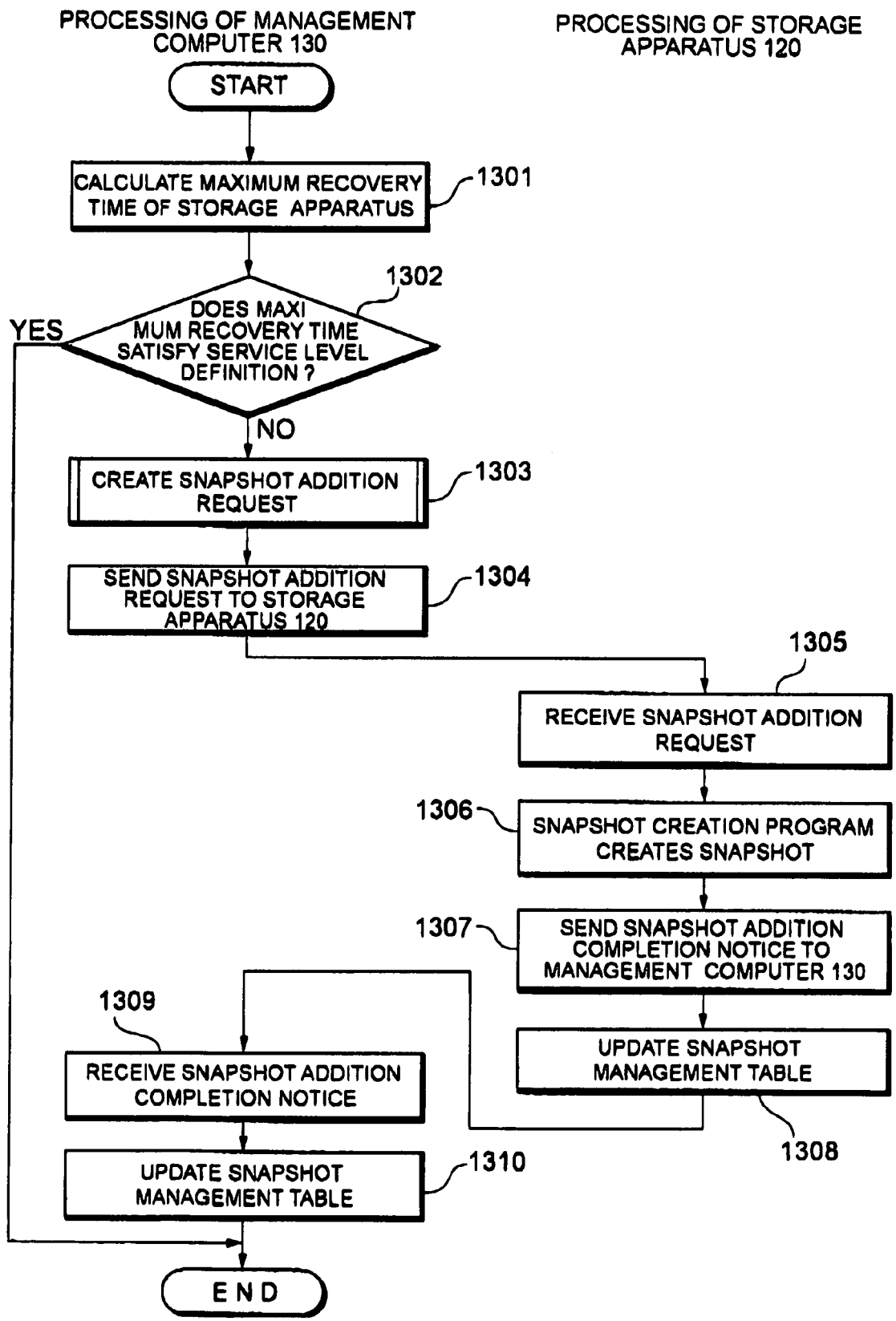
FIG. 13 is a diagram showing the snapshot addition processing flow in the first embodiment.
Figure 14:
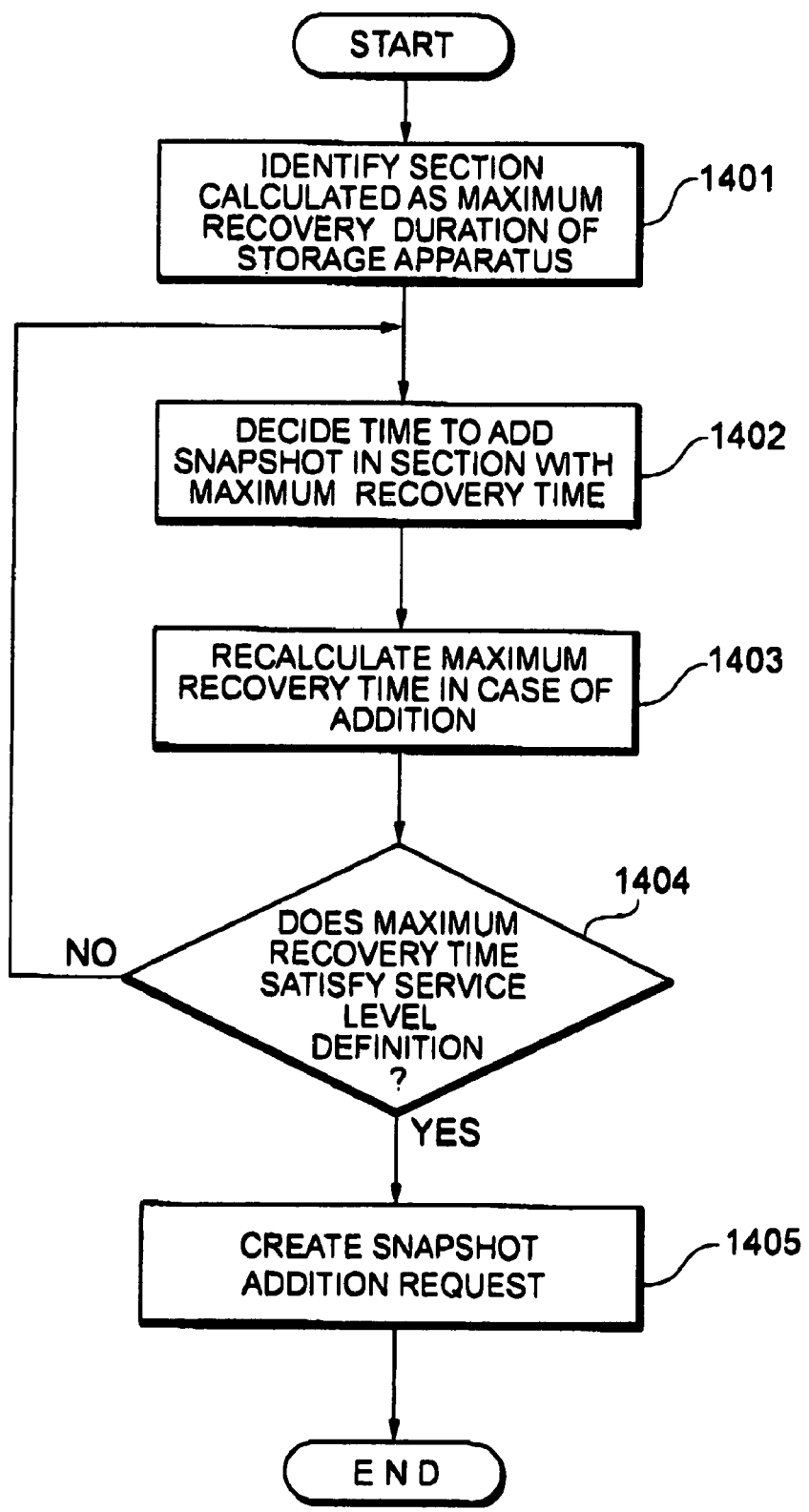
FIG. 14 is a diagram showing the snapshot addition request creation processing flow of the management computer in the first embodiment.

Next, snapshot addition request creation processing at step 1303 illustrated in FIG. 13 is now explained with reference to FIG. 14. This snapshot addition request creation processing is realized by the CPU 310 of the management computer 130 reading and executing the journal monitor/management program 324 from the memory 320.

Foremost, the journal monitor/management program 324 of the management computer 130 uses the snapshot management table 325 to identify the snapshot section having the largest recovery time calculated at step 1301 in FIG. 13, and identifies the snapshot information in related journal size information in this snapshot section (step 1401).

Next, snapshot addition time information is decided based on the foregoing identified snapshot information and journal size information so as to shorten the maximum recovery time. For example, when the snapshot section identified at step 1401 is represented with the section from the snapshot storage extent identifier 00:00 to the subsequent snapshot storage extent identifier 00:01 in the snapshot management table 325, the snapshot addition time information can be decided to be "2005 11 14 11:00" as the intermediate time of time information between both snapshots (step 1402).

Next, the maximum recovery time of the storage apparatus 120 in a case of adding a snapshot to the snapshot addition time decided at step 1401 is calculated (step 1403).

Next, whether the calculated maximum recovery time satisfies the service level definition is determined (step 1404). If the calculated maximum recovery time still does not satisfy the service level definition (step 1404; No), the routine returns to step 1402 once again and adds snapshot addition time information.

When the calculated maximum recovery time satisfies the service level definition (step 1404; Yes), a snapshot addition request is created. This snapshot addition request describes at least the snapshot addition time information, snapshot storage extent identifier, journal data storage extent identifier, and journal metadata extent identifier (step 1405). The processing is thereafter ended.

An example of specific recovery time operational processing by applying modified example 1 to the first embodiment is explained below.

Foremost, if the maximum recovery time of the storage apparatus of the migration destination does not satisfy the required recovery time as a result of the recovery time operational processing explained with reference to FIG. 13, the recovery time can be shortened by newly adding a snapshot. For example, in a system subsequently creates a different snapshot at time "12:00" after creating a snapshot at time "0:00", let it be assumed that the journal size between the two snapshots is 1000000 MB. In this system, if the journal read performance of the storage apparatus retaining the journal between the two snapshots is 100 MB/sec, 1000000 MB of journal data is applied to the snapshot at the point of 0:00 in order to recover the data immediately before 12:00. The recovery time in this case will be calculated as 1000000 (MB)/100 (MB/sec)=10000 (sec) based on formula (1). In other words, roughly 2.8 hours is required for recovery.

Here, when the required recovery time is defined as 1.4 hours in defining the service level, the management computer 130 requests the creation of a new snapshot at the time of "6:00" presumed to be roughly the intermediate point based on the snapshot addition request creation processing explained with reference to FIG. 14. According to this snapshot addition request; the respective storage apparatuses create and retain a snapshot satisfying the service level. And, as shown in FIG. 15, the management computer 130 is thereby able to execute the data recovery processing while satisfying the service level.

MODIFIED EXAMPLE 2

Although the service level was defined based on the service level definition information table 321 in FIG. 13, as a modified example, the administrator may also change the service level definition.

Figure 16:
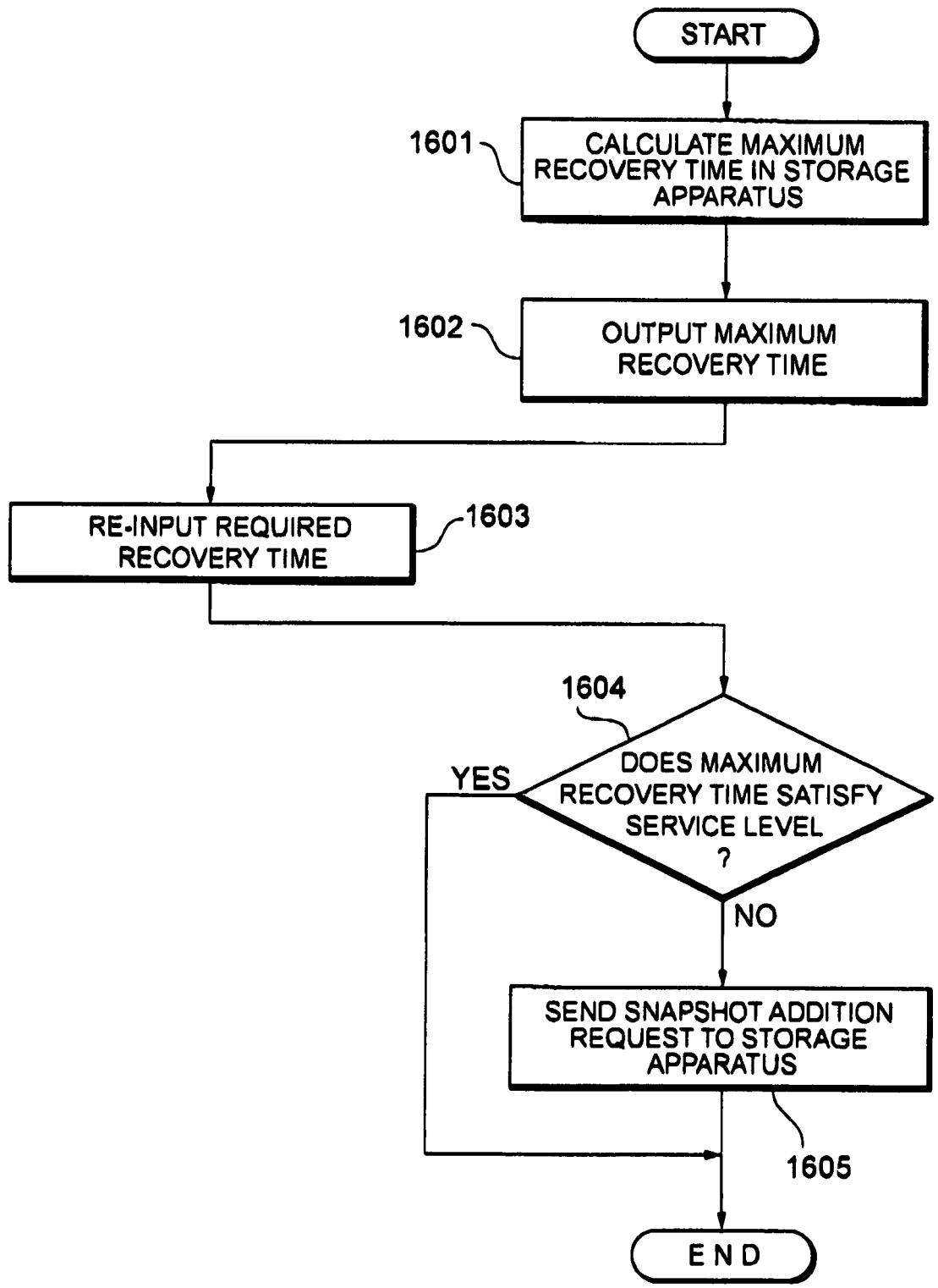
FIG. 16 is a diagram showing the processing flow when an administrator inputs the required recovery time in the first embodiment.

Service level definition change processing to be performed by the administrator is now explained with reference to FIG. 16.

Foremost, the management computer 130 calculates the maximum recovery time in the storage apparatus (step 1601). Next, the management computer 130 outputs the calculated maximum recovery time to the output device 340 (step 1602).

The administrator receives this and will thereby be able to newly define the service level; that is, the required recovery time. The administrator uses the input device 350 and inputs the required recovery time (step 1603). The management computer 130 compares the maximum recovery time calculated at step 1601 and the required recovery time input by the administrator and determines whether the maximum recovery time satisfies the service level, and, when it does satisfy the service level, the management computer 130 ends this processing (step 1604). When the maximum recovery time does not satisfy the service level at step 1604 (step 1604; No), the management computer 130 sends a snapshot creation request to this storage apparatus and ends this processing. Snapshot addition processing is as described with reference to FIG. 14 (step 1605).

Incidentally, in addition to the required recovery time of each storage apparatus, the administrator may also convey various requests such as a data migration command or snapshot deletion command to the management computer 130 via the input device 350.

As a result of the modified example described above, it is possible to perform the data management described below. Foremost, the management computer 130 migrates the journal that exceeded the elapsed time defined in the service level definition information table 321 to the second storage apparatus 120. The management computer 130 calculates the required recovery time with the journal read performance in the storage apparatus of the migration destination as the reference, and reports this to the administrator at step 1602 of the processing shown in FIG. 16. As a simple example, the recovery time based on a journal migrated to a storage apparatus in which the read performance ½ can be estimated to be double. Thus, when the administrator recognizes the change in parameter arising pursuant to the journal migration between the storage apparatuses and does not confirm to the original request values, the required recovery time is re-input at step 1603.

MODIFIED EXAMPLE 3

A modified example of the system configuration in the first embodiment is now explained with reference to FIG. 17.

Figure 17:
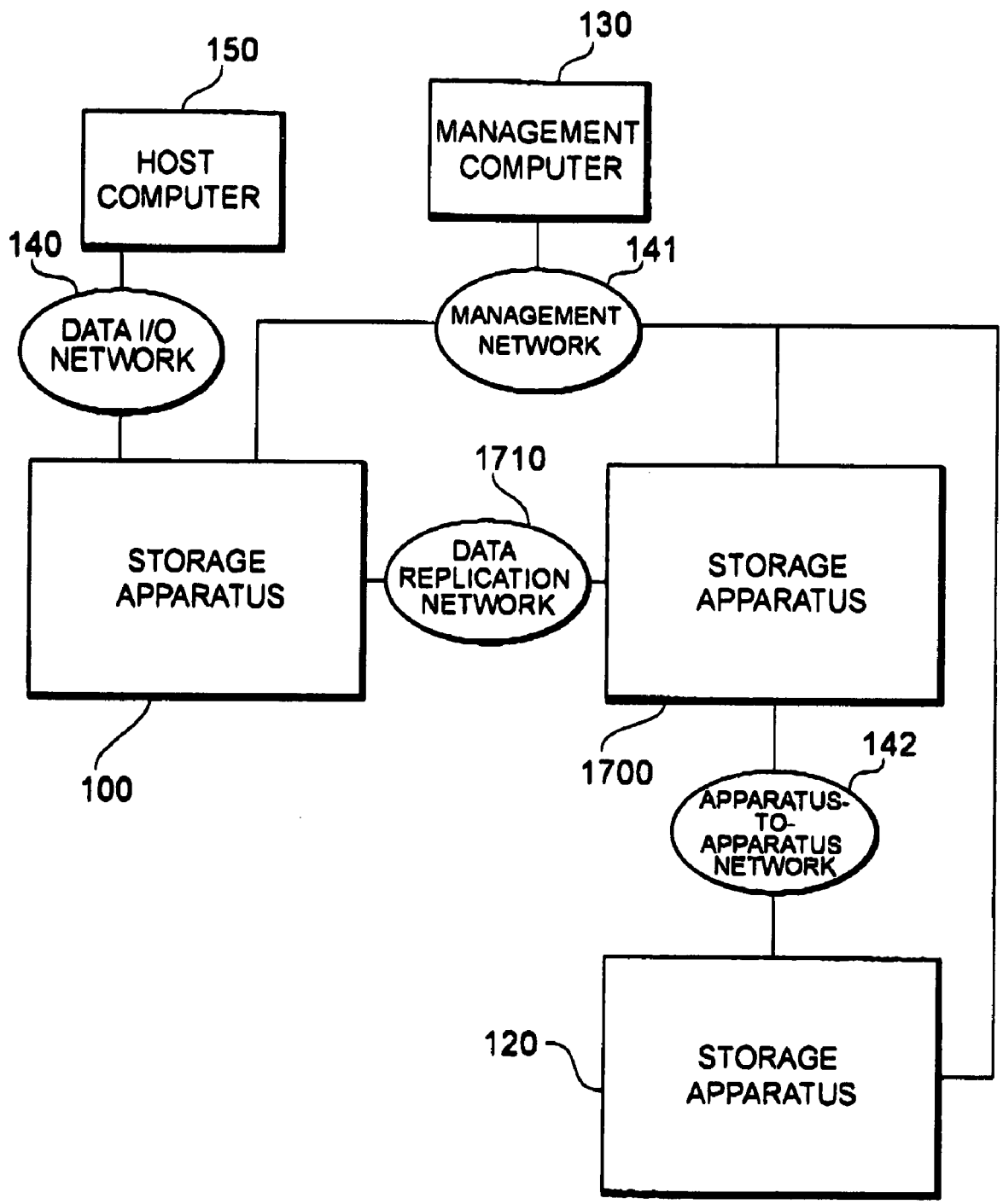
FIG. 17 is a diagram showing a modified example of the connection mode of the storage apparatus, host computer and management computer in the first embodiment.

The present embodiment shown in FIG. 17 is a diagram showing the system configuration for performing remote data replication (remote copy) between two bases in addition to the first embodiment. In FIG. 17, the storage apparatus 100, storage apparatus 120, a storage apparatus 1700, host computer 150, and management computer 130 are connected via the management network 141 so as to communicate with each other. The host computer 150 sends a data write request to the storage extent in the storage apparatus 100 via the data I/O network 140. Further, the storage apparatus 100 replicates and sends data to the storage apparatus 1700 installed at a remote location via a data replication network 1710. The data replication network 1710, for instance, is configured from a standard network connection mode such as a fibre channel or IP network.

The storage apparatus 1700 and storage apparatus 120 send and receive data via the storage-to-storage network 142, and function the same as the storage apparatus 100 and storage apparatus 120 in the first embodiment.

Thus, when the size of journal data to be stored in the storage apparatus 1700 of the remote copy destination become enormous and is not able to satisfy the service level, the management computer 130 may migrate the journal from the storage apparatus 1700 to the storage apparatus 120. According to this modified example, it is possible to perform the storage and management according to the service level of a journal in a remote location.

MODIFIED EXAMPLE 4

In the first embodiment described above, although the information in the service level definition information table 321 illustrated in FIG. 11 was decided based on the input by the administrator, this may also be decided by the management computer 130 selecting a storage apparatus of the migration destination among the plurality of storage apparatuses according to the data size at the time of journal migration, and migrating the journal.

Modified example 4 is now explained with reference to FIG. 18 and FIG. 19.

FIG. 18 shows an example of an apparatus-by-apparatus performance management table 1800 of the management computer 130. Recoverable time 1801 is stored in the apparatus-by-apparatus performance management table 1800 shown in FIG. 18. The recoverable time 1801 stores in advance time information required for the storage apparatus to perform the processing for restoring data using the journal size of a fixed amount and the value stored in the journal read performance 1002 in correspondence to the storage apparatus identifier 1001 storing identifying information of the storage apparatus of the system according to the present embodiment. As a specific example, assuming that the journal size is 300000 MB, the values to be stored in the recoverable time 1801 in correspondence to the storage apparatuses 100, 120 and 160 will be respectively calculated at roughly 0.83 (h), roughly 1.67 (h), and roughly 1.67 (h).

FIG. 19 shows an example of the service level definition information table 1900 of the management computer 130. A storage apparatus identifier 1901 is stored in the service level definition information table 1900 shown in FIG. 19. Identifying information of the storage apparatus to be selected by the management computer 130 at the time of journal migration is stored in the storage apparatus identifier 1901. In other words, the identifying information of the storage apparatus 100 corresponding to the value of 24 (h), which is the first threshold value stored in the elapsed time after acquisition of journal 1101, is stored in the column corresponding to the storage apparatus identifier 1901, but the identifying information of the storage i apparatus corresponding to the second threshold value onward stored in the elapsed time after acquisition of journal 1101 is not stored in the column corresponding to the storage apparatus identifier 1901.

Figure 12:
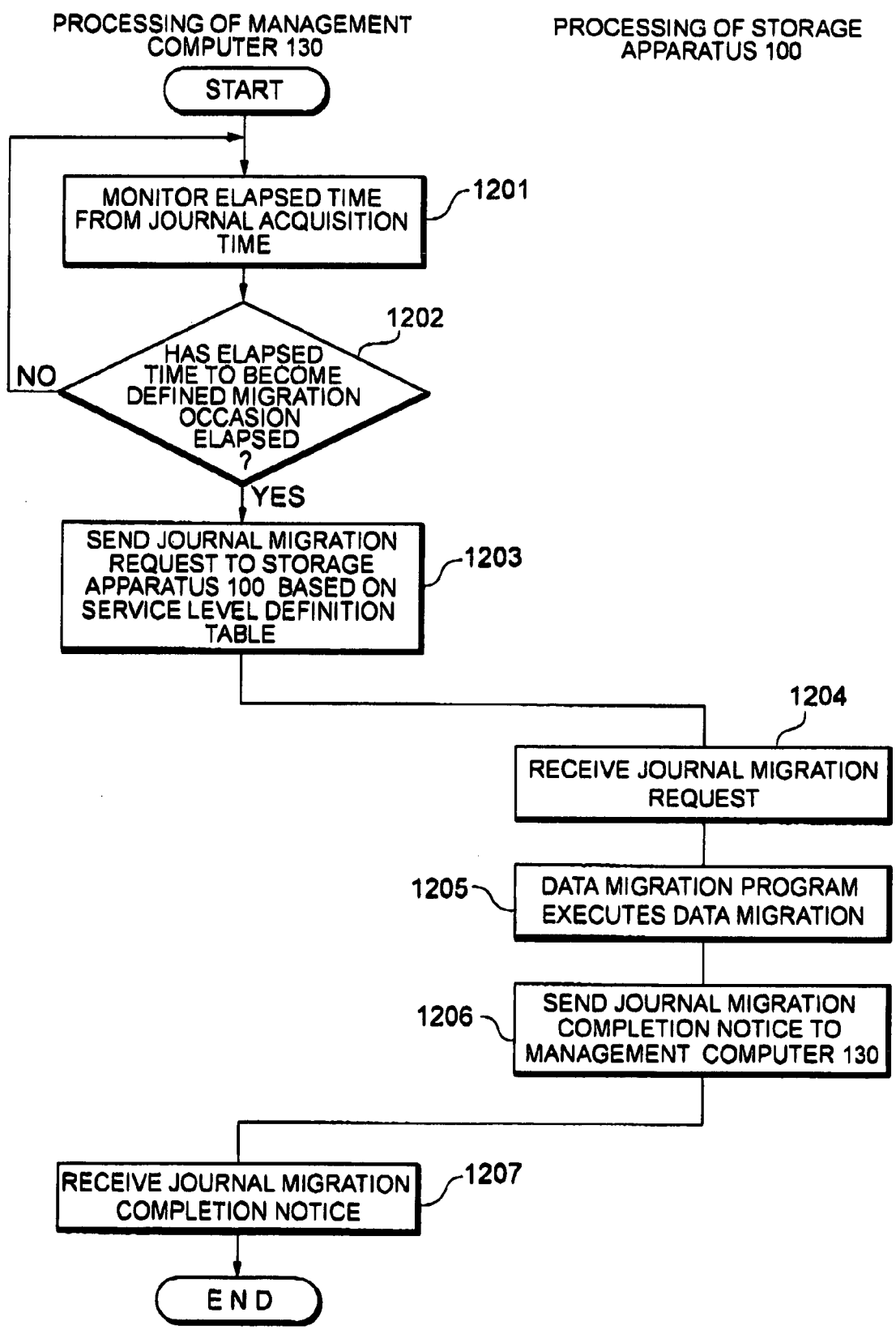
FIG. 12 is a diagram showing the journal migration processing flow in the first embodiment.

In this modified example, when a certain journal is exceeding the elapsed time after acquisition of journal 1101, the journal monitor/management program 324 of the management computer 130 refers to the apparatus-by-apparatus performance management table 1800 and service level definition information table 1900 at step 1203 of FIG. 12, and selects the storage apparatus of the migration destination.

Specifically, the journal monitor/management program 324 of the management computer 130 compares the recoverable time 1801 in the apparatus-by-apparatus performance management table 1800 and the required recovery time 1102 in the service level definition information table 1900, specifies a storage apparatus in which the value of the recoverable time 1801 is smaller than the value of the required recovery time 1102, decides this as the storage apparatus of the migration destination, and stores the identifying information of the decided storage apparatus in the column of the storage apparatus identifier 1901 of the service level definition information table 1900. Incidentally, with respect to journals to be migrated in subsequent occasions after this journal, the journal monitor/management program 324 of the management computer 130 refers to the value of the storage apparatus identifier 1901 of the service level definition information table 1900 and continues to migrate journals to the storage apparatus.

For example, if the elapsed time after acquiring the journal data regarding the data units in the data storage extent 110 is within 24 hours, the time requested by the user for recovering this data storage extent 110 will be 1 hour. Here, journal data is stored in the storage apparatus 100.

Next, if the elapsed time after the acquisition of journal data exceeds 24 hours but is within 168 hours, the required recovery time is 12 hours. The journal monitor/management program 324 refers to the recoverable time 1801 in the apparatus-by-apparatus performance management table 1800, selects the storage apparatus 120 as the migration destination from an unselected storage apparatus 120 or 160 in the system satisfying the recovery request time, and stores identifying information of the decided storage apparatus 120 in the column of the storage apparatus identifier 1901 of the service level definition information table 1900. Further, identifying information of the storage apparatus 120 is included in the journal migration request.

Further, when the elapsed time after the acquisition of journal data exceeds 168 hours, the required recovery time is 24 hours. Here, the journal monitor/management program 324 refers to the recoverable time 1801 in the apparatus-by-apparatus performance management table 1800, decides as the migration destination the unselected storage apparatus 160 in the system satisfying the recovery request time as the migration destination, and stores identifying information of the decided storage apparatus 160 in the column of the storage apparatus identifier 1901 of the service level definition information table 1900. Further, identifying information of the storage apparatus 160 is included in the journal migration request.

Like this, when the storage apparatuses 120, 160 in the system are not selected as the journal destination, the management computer 130 is able to refer to the recoverable time of the respective storage apparatuses upon sending the journal migration request, and decide the journal destination from the storage apparatus 100.

Incidentally, the service level information definition table 1900 shown in FIG. 19, for example, may also be automatically changed based on the remaining capacity or performance change (occurrence of failure) of the storage apparatus 100, storage apparatus 120, and storage apparatus 160.

Further, when the maximum recovery time of a certain storage apparatus does not satisfy the service level definition at stop 1302 in FIG. 13, the management computer 130 does not have to create a snapshot addition request, and may decide another storage apparatus satisfying the service level definition based on the changed service level definition table 1900, and migrate data.

MODIFIED EXAMPLE 5

In the first embodiment described above, although information in the service level definition information table 321 shown in the FIG. 11 was associated with each storage apparatus according to the elapsed time after acquisition of journal, this may also be associated with each storage extent.

Figure 20:
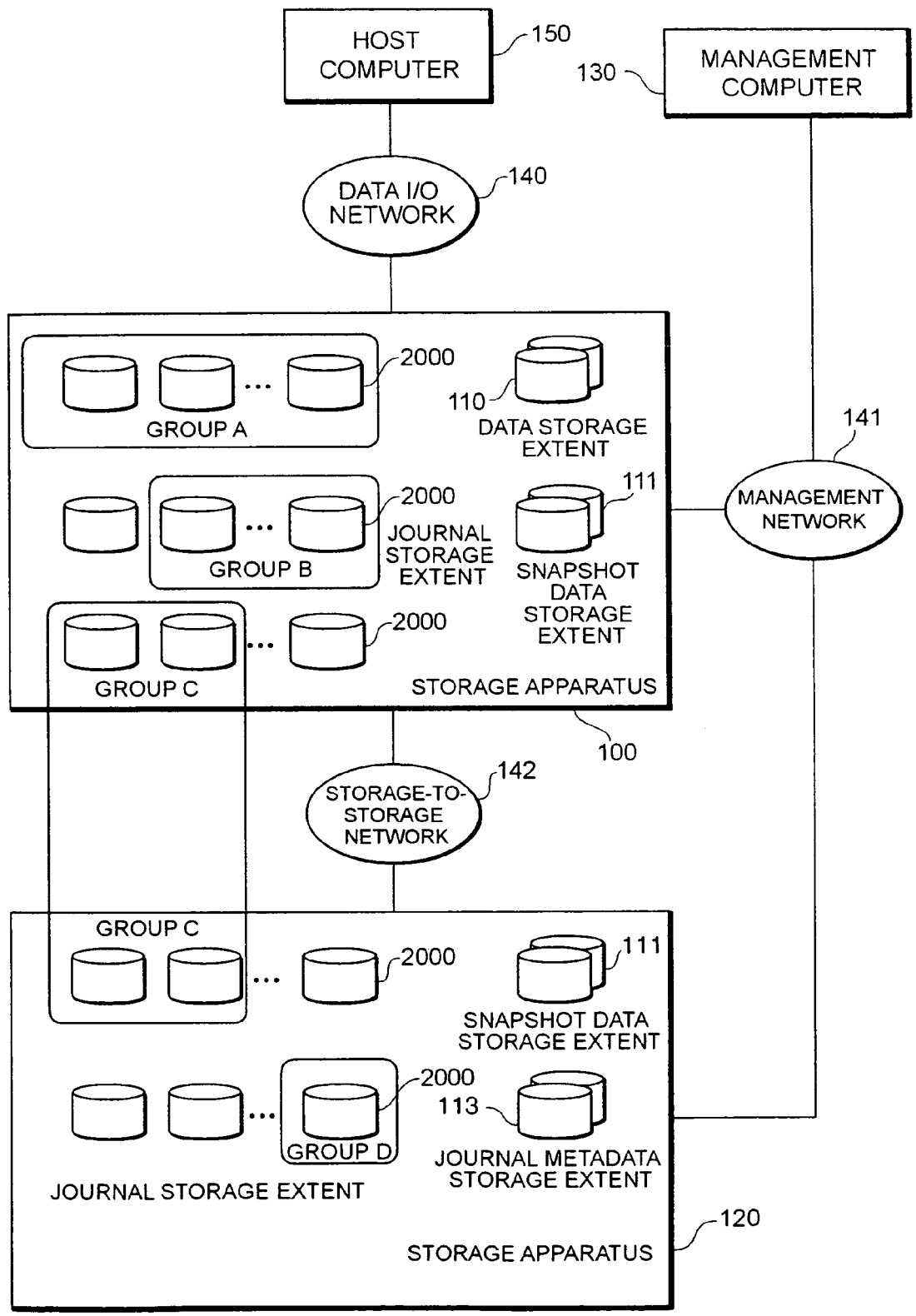
FIG. 20 is a diagram showing a modified example of the system configuration in the first embodiment.

FIG. 20 shows an example of a system defining the storage extents for storing journals as a group, and migrating journals for each group of these storage extents.

In the system shown in FIG. 20, the storage apparatus 100 and storage apparatus 120 have a plurality of journal storage extents 2000 for storing journal data and journal metadata. Further, the plurality of journal storage extents 2000 are defines as several groups (groups A to D shown in FIG. 20), and a service level is defined for each group. The groups of the journal storage extent 2000, as shown with group C in FIG. 20, may be defined by designating the journal storage extents 2000 of both the storage apparatus 100 and storage apparatus 120.

For example, if the elapsed time after acquiring the journal data regarding the data units in the data storage extent 110 is within 24 hours, the time requested by the user for recovering this data storage extent 110 will be 1 hour, and the management computer 130 specifies the storage extent of group A satisfying the required time of 1 hour and stores the journal. Further, if the elapsed time after acquisition of journal data exceeds 24 hours but is within 168 hours, the required recovery time is 12 hours, and the management computer 130 stores the journal in the storage extent of group B satisfying the required time of 12 hours.

Like this, as a result of employing modified example 5, in cases of using disk devices with different read performance in the same storage apparatus, it is possible to define a group by selecting the storage extent configured from a specified disk device, and satisfy the service level in each group.

MODIFIED EXAMPLE 6

In the foregoing first embodiment, although recovery processing of data at a time designated from the management computer 130 was performed in the storage apparatus 120 of the journal destination, the journal that was migrated from the storage apparatus 120 to the storage apparatus 100 may be transferred so as to perform recovery processing in the storage apparatus 100. Here, only the journal needs to be migrated from the storage apparatus 100 to the storage apparatus 120, and it is not necessary to migrate the snapshot data.

Further, the journal and snapshot data may be distributed and stored in different storage apparatuses so as to transfer data between the storage apparatuses.

Incidentally, in this modified example, the required recovery time defined in the service level definition information table 321 will be the required recovery time including the time required for transferring data.

We claim:

1. A computer system, comprising:
a management computer;
a first storage system connected to a host computer and the management computer; and
a second storage system connected to the host computer, the management computer, and the first storage system,
wherein the first storage system comprises:
a data volume including write data from the host computer;
a first journal volume including journal data acquired in accordance with the corresponding write data;

a first snapshot volume including snapshots, each corresponding to the data volume at a plurality of given times; and a first controller that applies a predetermined size of journal data to a snapshot at a first journal read speed, wherein the second storage system comprises:

a second journal volume including journal data received from the first storage system; and a second controller that applies the predetermined size of journal data to a snapshot at a second journal read speed, which is lower than the first journal read speed, wherein the management computer comprises:

a service level table that manages a designated elapsed time after acquisition of the journal data and a required recovery time, corresponding to the first storage system and the second storage system; and a processor that migrates a set of journal data from the first journal volume of the first storage system to the second journal volume of the second storage system, based on the designated elapsed time after acquisition of journal data corresponding to the first storage system defined in the service level table, wherein the processor adjusts a necessary recovery time of the second storage system, which is calculated by the second journal read speed and an amount of journal data for recovery, such that the necessary recovery time does not exceed the required recovery time defined in the service level table, and wherein the processor sends a recovery request including a designated recovery point of time to the second storage system, for applying journal data to a latest snapshot up to the designated recovery point of time within the required recovery time.

2. The computer system according to claim 1, wherein the first controller of the first storage system stores meta information of each journal data in the journal volume, and the processor of the management computer calculates an elapsed time after acquisition of journal data based on the meta information, compares the elapsed time with the designated elapsed time corresponding to the first storage system in the service level table, and determines to migrate journal data.

3. The computer system according to claim 2, wherein the meta information includes write time of journal data, sequence number of journal data, and size of journal data.

4. The computing system according to claim 1, wherein the first controller of the first storage system creates a new snapshot by applying all journal data from a certain point of time to a next point of time to an old snapshot corresponding to the data volume at the certain point of time.

5. The computing system according to claim 4, wherein the second controller of the second storage system creates a new snapshot by applying all journal data from a certain point of time to a next point of time to an old snapshot corresponding to the data volume at the certain point of time.

6. The computing system according to claim 5, wherein the processor of the management computer sends a command of adding a snapshot to the second storage system, when the necessary recovery time exceeds the required recovery time.

7. The computing system according to claim 6, wherein the processor of the management computer specifies a maximum time section for applying journal data from the old snapshot to the new snapshot of the plurality of snapshots stored in the second storage system, and sends the command of adding snapshot in the maximum time section.

8. The computing system according to claim 1, further comprising:

a third storage system connected to the host computer, the management computer, the first storage system, and the second storage system, wherein the third storage system comprises a third controller configured to apply the predetermined size of journal data for snapshot at a third journal read speed which is different from the second journal read speed, and wherein the processor of the management computer selects the second storage system or the third storage system for a target storage system of migration of journal data according to a size of the set of journal data and the second and third journal read speed, when the processor determines to migrate the set of journal data from the first journal volume of the first storage system.

9. The computing system according to claim 1, wherein the service level table is automatically changed based on at least one of a remaining capacity of the first or the second storage system, occurrence of failure in the first or the second storage system, and a change of the first or the second journal read speed.

* * * * *